E. E. NOBLE.
CHAIN LOCK.
APPLICATION FILED MAR. 24, 1919.

1,321,469.

Patented Nov. 11, 1919.

Witness
J. R. Pier

Inventor
E. E. Noble
By H. R. Wilson & Co.
Attorneys

UNITED STATES PATENT OFFICE.

ELMER E. NOBLE, OF YORK, PENNSYLVANIA.

CHAIN-LOCK.

1,321,469.  Specification of Letters Patent.  Patented Nov. 11, 1919.

Application filed March 24, 1919. Serial No. 284,535.

*To all whom it may concern:*

Be it known that I, ELMER E. NOBLE, a citizen of the United States, residing at York, in the county of York and State of Pennsylvania, have invented certain new and useful Improvements in Chain-Locks; and I do declare the following to be a full, clear, and exact description of the invention, such as will enable others skilled in the art to which it appertains to make and use the same.

My invention relates to chain locks of the type used principally for tire chains, although the device is not restricted to use in this particular field.

The object of the invention is to improve upon the device shown by my United States Patent No. 1261052 of April 2nd, 1918, to such an extent as to provide for more effective holding of the guard in operative position and for more easy release of said guard without the necessity of using a pair of pliers, screw-driver, or other tool.

With the foregoing in view, the invention resides in the novel construction and arrangement of parts herein fully described and claimed.

Figure 1 of the accompanying drawing illustrates a side elevation of the lock with the guard in closed position, the locking pin being in section.

Figure 1:
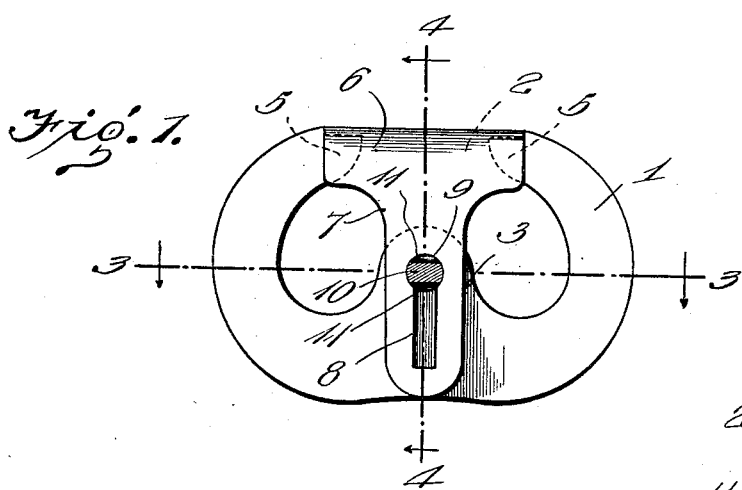

In the drawing above briefly described, the numeral 1 designates an open link having a gap 2 in one side and provided on its other side with an inwardly extending lug 3 having a circular opening 4. The ends of the link 1 are reduced as seen at 5 and are received in the ends of an arched, sheet metal guard 6, the sides of said guard having integral parallel arms 7 which contact slidably with opposite sides of the lug 3. Arm 7 is provided with a longitudinally extending keyhole slot 8 and the enlarged ends 9 of these slots, normally receive the locking pin 10 which is rotatably mounted in the opening 4 of lug 3. It thus follows that longitudinal sliding of the arms 7 is prevented and consequently the guard 6 is retained in active position. By means of transverse grooves 11 however, the pin 10 is narrowed near its ends for reception in the slots 8 when said pin is turned sufficiently. To accomplish this turning without the use of a tool, one end of pin 10 is provided with a finger piece 12, but said pin could be turned by other means also. Although I have shown the end of the pin remote from the head 12, upset at 13 upon a washer 14, it will be obvious that said pin might be held in place by other preferred means.

Figure 2:
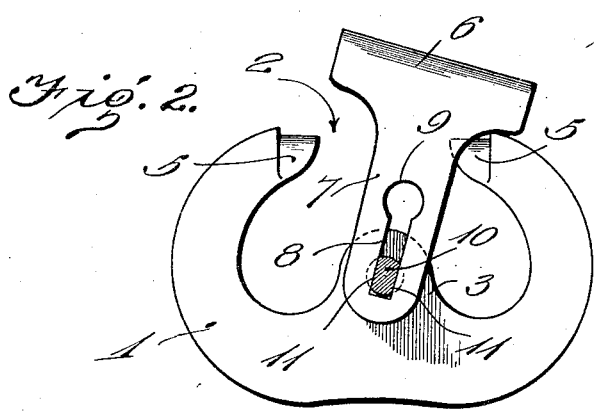
Fig. 2 is a duplicate of Fig. 1 with the exception that it illustrates the guard in released position.
Figure 4:
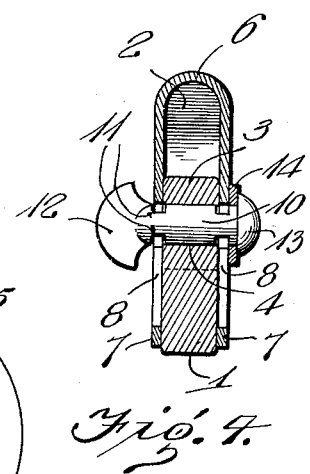
Fig. 4 is a vertical transverse section on the plane designated by the line 4—4 of Fig. 1.
Figure 3:
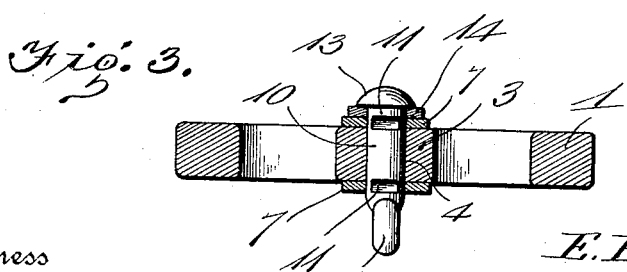
Fig. 3 is a horizontal section on the plane of the line 3—3 of Fig. 1.

When the pin 10 is turned sufficiently from the position of Fig. 1, its narrowed portions are receivable in the slots 8, thereby allowing the guard 6 to be shifted outwardly from the link 1, the pin then forming a pivot upon which the guard may be swung to one side as illustrated in Fig. 2. With the guard thus released, the ends of the chain may be hooked over the ends of the link, and when the guard is closed and locked by the pin 10, disconnection of said chain ends will be prevented. The device is extremely simple and inexpensive yet is of great advantage, and since probably the best results are obtained from the details disclosed, they may well be followed, but within the scope of the invention as claimed, numerous minor changes might well be made.

I claim:

A chain lock comprising an open link having a gap at one side and a lug extending inwardly from its other side and formed with a circular opening, an arched guard bridging the aforesaid gap and receiving the ends of the link in its ends, flat arms extending from said guard and contacting with opposite sides of said lug, said arms having longitudinal keyhole slots whose enlarged ends normally aline with the opening of said lug, a rotary pin passing through said opening and said enlarged slot ends and normally preventing sliding of said arms to release said guard, said pin having narrowed portions receivable in said slots when the pin is turned, whereby to allow release of the guard, and a head on one end of said pin for turning the latter to locking and released positions.

In testimony whereof I have hereunto set my hand.

ELMER E. NOBLE.

Witnesses:
　NOAH C. MAY,
　ELI G. LEATHERY.

Copies of this patent may be obtained for five cents each, by addressing the "Commissioner of Patents, Washington, D. C."